United States Patent
Tien et al.

(10) Patent No.: US 7,965,628 B2
(45) Date of Patent: Jun. 21, 2011

(54) DATA TRANSMITTING METHOD FOR WIRELESS COMMUNICATION SYSTEM

(75) Inventors: Kai-Wen Tien, Tainan (TW); Jia-Jie Chiang, Pingjhen (TW)

(73) Assignee: Quanta Computer Inc., Tao Yuan Shien (TW)

( * ) Notice: Subject to any disclaimer, the term of this patent is extended or adjusted under 35 U.S.C. 154(b) by 974 days.

(21) Appl. No.: 11/892,079

(22) Filed: Aug. 20, 2007

(65) Prior Publication Data

US 2008/0205335 A1 Aug. 28, 2008

(30) Foreign Application Priority Data

Feb. 27, 2007 (TW) .............................. 96106810 A

(51) Int. Cl.
*H04L 1/00* (2006.01)
(52) U.S. Cl. .......................... 370/229; 370/428; 370/508
(58) Field of Classification Search .................. 370/229, 370/328, 294, 428, 509; 375/260, 295; 455/101; 714/746
See application file for complete search history.

(56) References Cited

U.S. PATENT DOCUMENTS

| | | | | | |
|---|---|---|---|---|---|
| 3,731,198 | A | * | 5/1973 | Blasbalg ......................... | 375/367 |
| 4,354,229 | A | * | 10/1982 | Davis et al. .................... | 710/104 |
| 5,490,144 | A | * | 2/1996 | Tran et al. ...................... | 370/238 |
| 5,491,535 | A | * | 2/1996 | Hirata et al. ....................... | 399/8 |
| 5,493,722 | A | * | 2/1996 | Gunn et al. .................... | 455/517 |
| 5,550,547 | A | * | 8/1996 | Chan et al. ....................... | 342/42 |
| 5,905,871 | A | * | 5/1999 | Buskens et al. ............... | 709/245 |
| 6,118,769 | A | * | 9/2000 | Pries et al. ..................... | 370/324 |
| 6,269,080 | B1 | * | 7/2001 | Kumar .......................... | 370/236 |
| 7,030,761 | B2 | * | 4/2006 | Bridgelall et al. .......... | 340/572.2 |
| 7,158,473 | B2 | * | 1/2007 | Kurobe et al. ................. | 370/204 |
| 7,167,449 | B2 | * | 1/2007 | Ikeda et al. .................... | 370/235 |
| 7,502,338 | B1 | * | 3/2009 | Whitby-Strevens .......... | 370/292 |
| 7,684,502 | B2 | * | 3/2010 | Kurobe et al. ................. | 375/260 |
| 7,688,750 | B2 | * | 3/2010 | Chen et al. ..................... | 370/252 |
| 7,773,498 | B2 | * | 8/2010 | Kurobe et al. ................. | 370/204 |
| 2004/0027235 | A1 | * | 2/2004 | Steindl ......................... | 340/3.42 |
| 2004/0228273 | A1 | * | 11/2004 | Kurobe et al. ................. | 370/229 |
| 2005/0018784 | A1 | * | 1/2005 | Kurobe et al. ................. | 375/260 |
| 2006/0050772 | A1 | * | 3/2006 | Shemesh et al. .............. | 375/145 |
| 2006/0104232 | A1 | * | 5/2006 | Gidwani ........................ | 370/328 |

(Continued)

OTHER PUBLICATIONS

On optimizing backoff counter reservation and classifying stations for the IEEE 802.11 distributed wireless LANs Y Xiao, FH Li, K Wu, KK Leung—IEEE 2006.*

(Continued)

*Primary Examiner* — Salman Ahmed
(74) *Attorney, Agent, or Firm* — Rabin & Berdo, P.C.

(57) ABSTRACT

A data transmitting method for wireless communication system applied in a transmitting device for transmitting a number of data packets to a receiving device is provided. Firstly, n data packets are transmitted to the receiving device during the first time period, wherein n is a nature number. Next, the first accumulated number is recorded, wherein the first accumulated number denotes the times of resending the n data packets during the first time period. Then, determine that whether the first accumulated number exceeds a predetermined value or not. If the first accumulated number exceeds the predetermined value, then other communication methods are adopted and the method carries on transmitting the remaining data packets; if the first accumulated number does not exceed the predetermined value, the first accumulated number is cleared, and the method carries on transmitting the remaining data packets to the receiving device.

10 Claims, 4 Drawing Sheets

U.S. PATENT DOCUMENTS

| | | | |
|---|---|---|---|
| 2007/0063867 A1* | 3/2007 | Fuller et al. | 340/870.02 |
| 2007/0121482 A1* | 5/2007 | Kurobe et al. | 370/204 |
| 2007/0176751 A1* | 8/2007 | Cesar et al. | 340/10.32 |
| 2007/0190951 A1* | 8/2007 | Lampinen et al. | 455/101 |
| 2007/0195819 A1* | 8/2007 | Chen et al. | 370/468 |
| 2007/0234170 A1* | 10/2007 | Shao et al. | 714/746 |
| 2008/0205335 A1* | 8/2008 | Tien et al. | 370/329 |
| 2009/0135764 A1* | 5/2009 | In et al. | 370/328 |
| 2009/0252236 A1* | 10/2009 | Li et al. | 375/260 |
| 2009/0268747 A1* | 10/2009 | Kurata et al. | 370/412 |
| 2009/0279638 A1* | 11/2009 | Kurobe et al. | 375/295 |
| 2010/0226295 A1* | 9/2010 | Sun et al. | 370/294 |

OTHER PUBLICATIONS

Performance analysis of wireless LANs: an integrated packet/flow level approach R Litjens, F Roijers, H Berg, RJ Boucherie—2003.*

Analysis of a Data Communication Network's Performance under Varying Retransmission Disciplines JR Kirwan Jr—1990.*

* cited by examiner

DATA TRANSMITTING METHOD FOR WIRELESS COMMUNICATION SYSTEM

This application claims the benefit of Taiwan application Serial No. 096106810, filed Feb. 27, 2007, the subject matter of which is incorporated herein by reference.

BACKGROUND OF THE INVENTION

1. Field of the Invention

The invention relates in general to a data transmitting method for wireless communication system, and more particularly to a data transmitting method capable of determining the quality of the current wireless communication channel according to the times of packet-resending and improving the efficiency of wireless communication according to a number of strategies.

2. Description of the Related Art

With the advance in science and technology, wireless communication system has now been widely used in various electronic products. The quality of wireless communication channel affects the efficiency of wireless communication significantly, such as data transmission rate, communication bandwidth and transmission error rate. Besides, the wireless communication channel is subjected to environmental factors, for example, when the quality of wireless communication channel deteriorates due to the interference of noises or channel occupation by other communication systems, the success rate in wireless transmission of packets and the bandwidth for data transmission would be decreased and the data error rate would be increased. Therefore, how to develop a method capable of effectively increasing the transmission efficiency of wireless communication under a poor quality of wireless communication channel has been a focus in the eyes of the manufacturers.

SUMMARY OF THE INVENTION

The invention is directed to a data transmitting method for wireless communication system capable of effectively resolving the problem that the wireless communication efficiency of a conventional wireless communication system deteriorates due to a poor quality of the wireless communication channel. The data transmitting method further has the advantages of effectively improving the transmission efficiency of wireless communication under a poor quality of wireless communication channel, reducing the likelihood of wireless communication packet-resending and increasing the success rate in the wireless transmission of packets.

According to a first aspect of the present invention, a data transmitting method for wireless communication system applied in a transmitting device for transmitting a number of data packets to a receiving device is provided. Firstly, n data packets are transmitted to the receiving device during the first time period, wherein n is a nature number. Next, the first accumulated number is recorded, wherein the first accumulated number denotes the times of packet-resending during the first time period. Then, it is determined whether the first accumulated number exceeds a predetermined value. If the first accumulated number exceeds the predetermined value, then other communication methods are adopted and carry on to transmit the remaining data packets; if the first accumulated number does not exceed the predetermined value, then the first accumulated number is cleared, and the method carries on to transmit the remaining data packets to the receiving device.

The invention will become apparent from the following detailed description of the preferred but non-limiting embodiments. The following description is made with reference to the accompanying drawings.

DETAILED DESCRIPTION OF THE INVENTION

Figure 1:
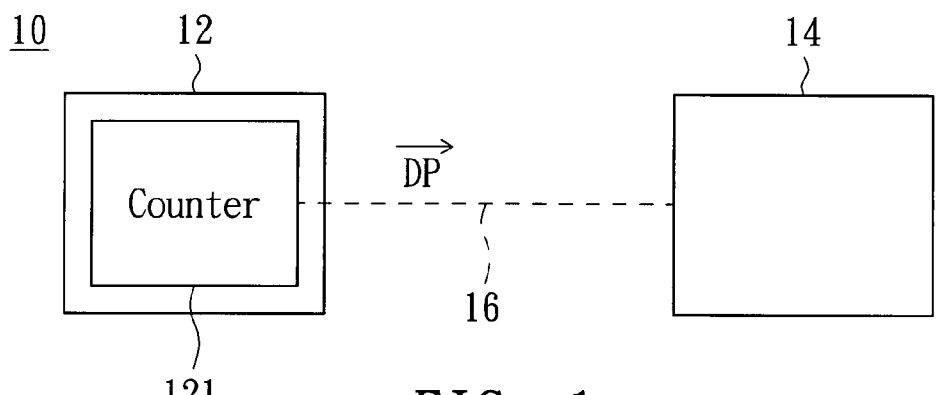
FIG. 1 is a block diagram of a wireless communication system using a data transmitting method for wireless communication system according to a preferred embodiment of the invention.

Referring to FIG. 1, a block diagram illustrating a data transmitting method for wireless communication system according to a preferred embodiment of the invention is shown. The wireless communication system 10 includes a transmitting device 12 and a receiving device 14. The transmitting device 12 transmits a number of data packets DP to the receiving device 14 via a wireless communication channel 16. The transmitting device 12 of the preferred embodiment of the invention has a counter 121 used for recording the times of packet-resending as a result of the transmitting device 12 fails in transmitting data packets DP under the poor quality of the wireless communication channel 16. The data transmitting method for wireless communication system of the preferred embodiment of the invention improves the transmission efficiency by adjusting mechanisms according to the times of packet-resending.

Figure 2A:
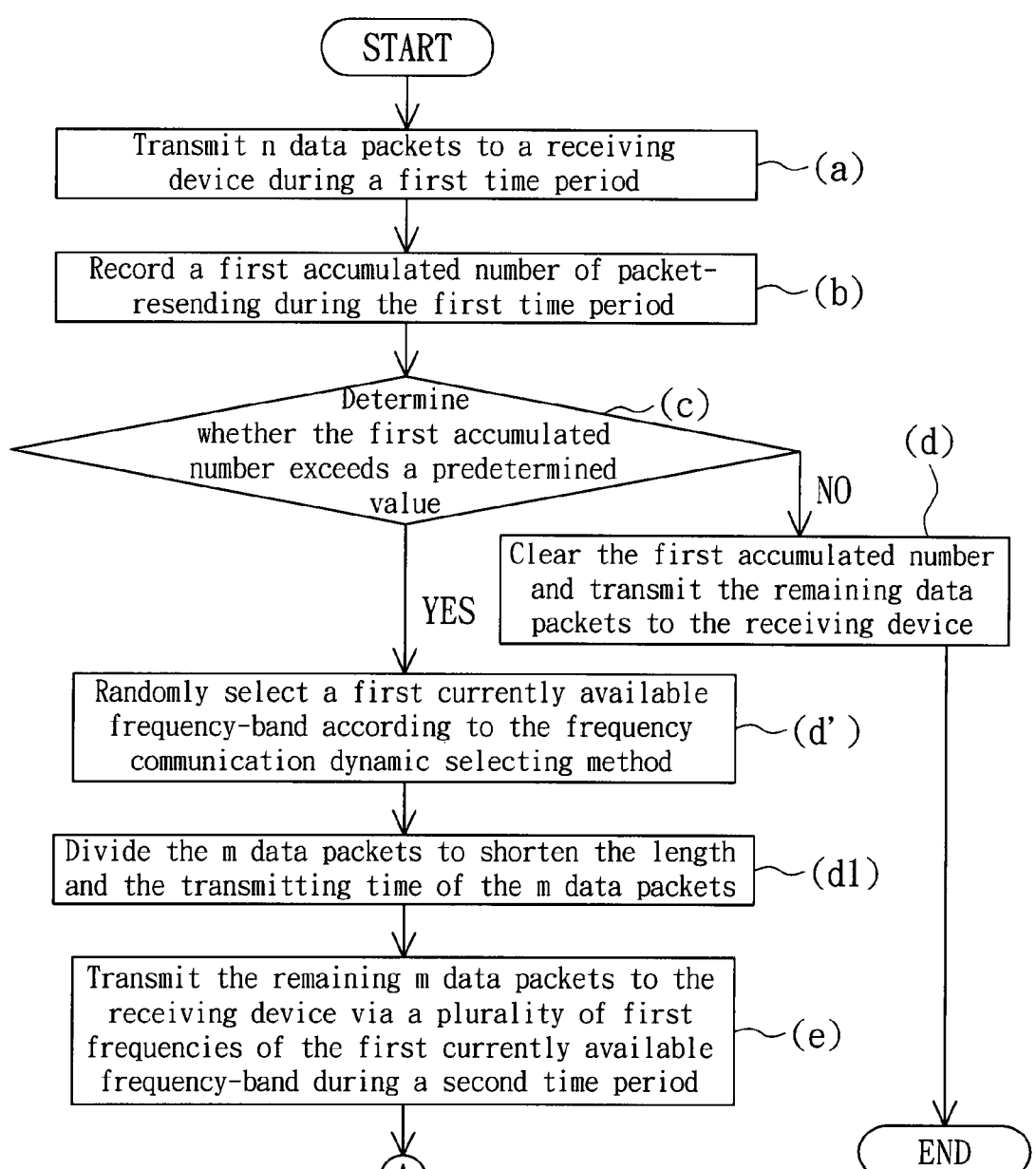
FIGS. 2A and 2B are flowcharts of the data transmitting method for wireless communication system according to a preferred embodiment of the invention.
Figure 2B:
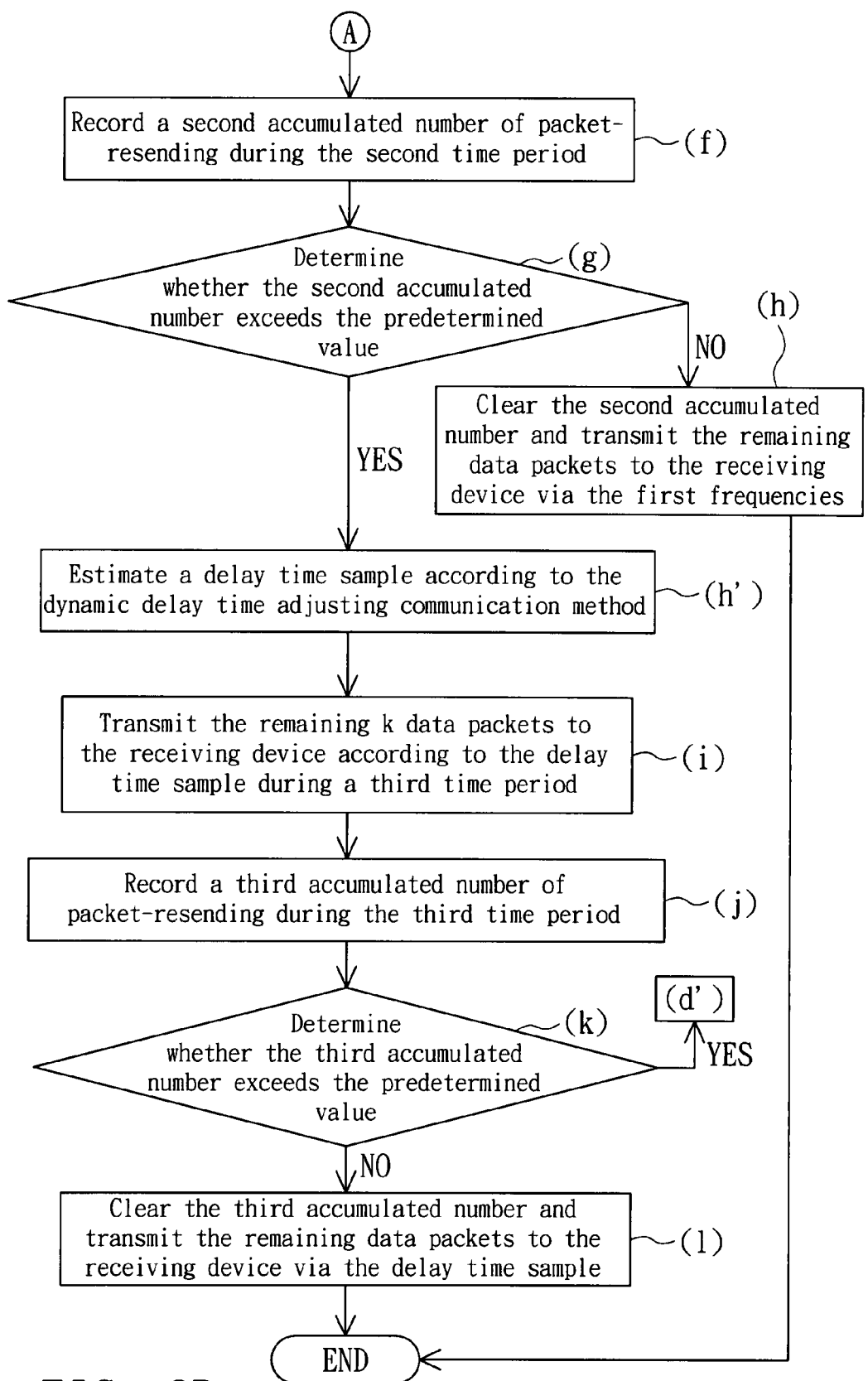

Referring to FIGS. 2A and 2B, flowcharts of the data transmitting method for wireless communication system according to a preferred embodiment of the invention are shown. Firstly, the method begins at step (a), the transmitting device 12 transmits n data packets of the data packets DP to the receiving device 14 during a time period, wherein n is a nature number. Next, the method proceeds to step (b), the counter 121 records an accumulated number, wherein the accumulated number is the times of packet-resending as a result of the transmitting device 12 fails in transmitting the n data packets DP under the poor quality of the wireless communication channel 16 during the time period.

Then, the method proceeds to step (c), the transmitting device 12 determines whether the accumulated number exceeds a predetermined value. If not, the method proceeds to step (d), the accumulated number of the counter 121 is cleared by the transmitting device 12, and the method carries on transmitting the remaining data packets DP to the receiving device 14. In the preferred embodiment of the invention, the predetermined value is a parameter which stands for a minimum tolerable level of channel quality for the user. The predetermined value is set by a user and is, for example, an accumulated number of packet-resending during a time period.

In step (c), if the accumulated number exceeds the predetermined value, it means that the current quality of the wireless communication channel 16 is below the user's minimum tolerable level Then the method proceeds to step (d'), the receiving device 14 randomly selects the current available frequency-band of the wireless communication channel 16 and several different frequencies thereof according to the frequency communication dynamic selecting method and passes the information both of the selected available frequency-band and frequencies to the transmitting device 12. That is, the receiving device 14 obtains and provides a better available frequency-band to the transmitting device 12, and after the antenna of the transmitting device 12 randomly selects frequencies of the available frequency-band, the transmitting device 12 clears the accumulated number recorded in the counter 121. Next, the method proceeds to step (e), the transmitting device 12 transmits the remaining m data packets of the data packet DP to the receiving device 14 via the selected frequencies of the available frequency-band during next time period, wherein m is a nature number.

Then, the method proceeds to step (f), the counter 121 once again records the accumulated number of packet-resending in transmission. Next, the method proceeds to step (g), the transmitting device 12 once again determines whether the accumulated number exceeds a predetermined value so as to determine whether to effectively transmit the data packets via the frequencies of the available frequency-band to resolve the problem of poor efficiency in wireless communication between the transmitting device 12 and the receiving device 14. If not, the method proceeds to step (h), the transmitting device 12 clears the accumulated number of the counter 121 and continues to randomly select other frequencies from the available frequency-band according to the frequency communication dynamic selecting method to transmit the remaining data packets DP to the receiving device 14.

The transmitting device 12 of the preferred embodiment of the invention is a multi-antenna system having a number of antenna devices. The transmitting device 12 divides the data packets DP into several data flows outputted via corresponding antenna devices. In the step (e), the transmitting device 12 randomly distributes the frequencies of the available frequency-band to the antenna devices with poor communication channel quality, such that the antenna devices with poor communication channel quality are able to randomly output the data packets of data flows via different frequencies. Meanwhile, each antenna device outputs its corresponding data flow via respective frequency to avoid mutual interference.

After step (g), if the accumulated number exceeds the predetermined value, this implies that the transmission of data packets between the transmitting device 12 and the receiving device 14 can not be effectively improved via the frequencies of available frequency-band, then the method proceeds to step (h'), the transmitting device 12 estimates several delay time samples according to the dynamic delay time adjusting communication method. The steps of dynamic delay time adjusting communication method is as the following: the transmitting device 12 assigns different delay times to the antennas with poor communication channel quality, the delay time caused by "resending" is used as a dynamic time sample, then the transmitting device 12 clears the accumulated number of the counter 121. Next, the method proceeds to step (i), the transmitting device 12 dynamically adjusts the launching time of the antenna device according to the delay time samples, so as to transmits the remaining k data packets of the data packet DP to the receiving device 14 during next time period, wherein k is a nature number.

Then, the method proceeds to step (j), the counter 121 once again records the accumulated number of packet-resending in transmission. Next, the method proceeds to step (k), the transmitting device 12 once again determines whether the accumulated number exceeds a predetermined value so as to determine whether to effectively resolve the problem of poor efficiency in wireless communication according to the dynamic delay time adjusting communication method. If not, the method proceeds to step (l), the transmitting device 12 clears the accumulated number of the counter 121 and continues to transmit the remaining data packets DP to the receiving device 14 according to the delay time samples according to the dynamic delay time adjusting communication method.

After step (k), if the accumulated number exceeds the predetermined value, this implies that the transmission of data packets between the transmitting device 12 and the receiving device 14 can not be effectively improved according to the dynamic delay time adjusting communication method, then the method proceeds back to step (d'), the receiving device 14 once again randomly selects the available frequency-band and the frequencies thereof from the current wireless communication channel 16 according to the frequency communication dynamic selecting method and passes the information both of the selected available frequency-band and communication frequency to the transmitting device 12. Next, the method proceeds to the steps following step (d') to improve the efficiency in wireless communication between the transmitting device 12 and the receiving device 14 according to the frequency communication dynamic selecting method and the dynamic delay time adjusting communication method.

Thus, the data transmitting method for wireless communication system of the preferred embodiment of the invention is capable of effectively determining whether the current channeling quality of the wireless communication channel 16 is lower than the user's minimum tolerable limit according to the accumulated number of packet-resending during the transmission of the n, m or k data packets by the transmitting device 12. If the quality of the wireless communication channel 16 is lower than the minimum tolerable limit, the wireless communication between the transmitting device 12 and the receiving device 14 is improved by repeating the frequency communication dynamic selecting method and the dynamic delay time adjusting communication method.

Figure 3:
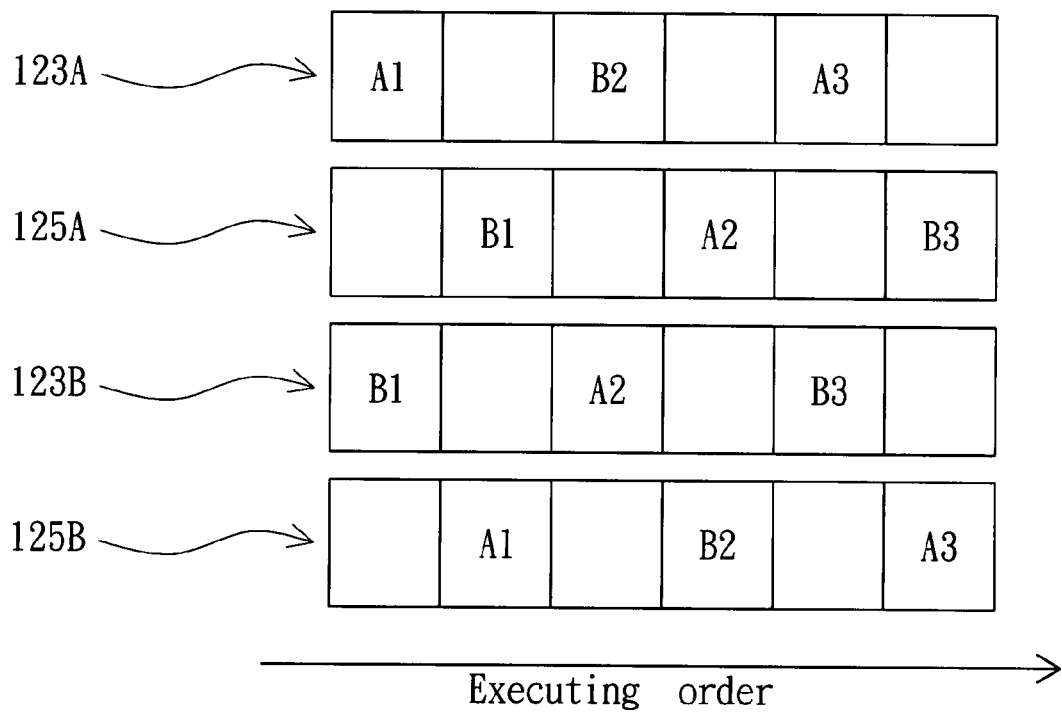
FIG. 3 is a perspective of antenna devices, diverse-space buffers and data flows of the transmitting device 12 according to a preferred embodiment of the invention.

The transmitting device 12 of the preferred embodiment of the invention further has a number of antenna devices and diverse-space buffers corresponding to the antenna devices as indicated in FIG. 3, which shows the perspective of antenna devices, diverse-space buffer and data flows of the transmitting device 12. The transmitting device 12 has two antenna devices 123A and 123B and two diverse-space buffers 125A and 125B corresponding to the two antenna devices 123A and 123B respectively for transmitting two data flows A and B. The data flows A and B respectively include data packets A1~A3 and B1~B3 alternately disposed and outputted by the antenna devices 123A and 123B. When no data packet has to be resent, the antenna device 123A sequentially outputs the data packets A1, B2 and A3, and the antenna device 123B sequentially outputs the data packets B1, A2 and B3.

The diverse-space buffer 125A is used for storing the data packets B1, A2 and B3, and the diverse-space buffer 125B is used for storing the data packets A1, B2 and A3. When one of the antenna devices fails in transmitting any data packet i.e. the data packet needs to be resent, the other antenna device would get the same data packet in its own buffer and resend it in the next time period. For example, when the antenna device 123A fails in transmitting the data packet B2, the transmitting device 12 can output the same data packet B2 stored in the diverse-space buffer 125B in the next time period via the antenna device 123B.

Thus, when one of the antenna devices such as antenna device 123A fails in transmitting the data packet, the transmitting device 12 can resend the data packet in the next time period via another antenna device 123B, effectively avoiding repeatedly transmitting the data packet by the same antenna device which may be broken, and effectively reducing the likelihood of packet-resending. Thus, with the mechanism of the diverse-space buffer, it is achievable to reduce the likelihood of resending data packet and effectively increase the success rate in the transmission of data packets.

Figure 4:
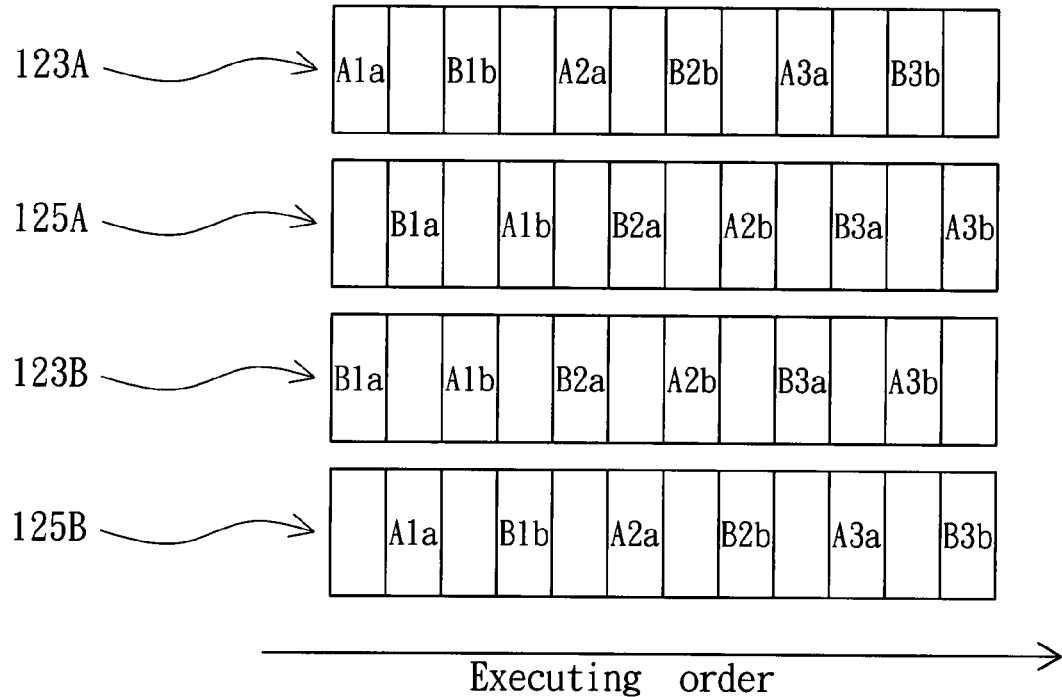
FIG. 4 is another perspective of antenna devices, diverse-space buffers and data flows of the transmitting device 12 according to a preferred embodiment of the invention.

Between step (d') and step (e) of the data transmitting method, the method further includes step (d1). The transmitting device 12 divides m data packets into several ones to shorten the length of the data packet. As indicated in FIG. 4, the transmitting device 12 respectively divides the packets of the data packets A1, A2, A3, B1, B2 and B3 into A1$a$ and A1$b$, A2$a$ and A2$b$, A3$a$ and A3$b$, B1$a$ and B1$b$, B2$a$ and B2$b$, B3$a$ and B3$b$, and the length of A1$a$ and A1$b$, A2$a$ and A2$b$, A3$a$ and A3$b$, B1$a$ and B1$b$, B2$a$ and B2$b$, B3$a$ and B3$b$ are equal to a half that of the data packets A1, A2, A3, B1, B2 and B3, respectively. Thus, in step (e), the data packets transmitted by the transmitting device 12 have shorter length, such that the transmitting time of each data packet is shortened accordingly. As a result, the transmitting efficiency of the data packets during a time period is further increased.

Figure 5:
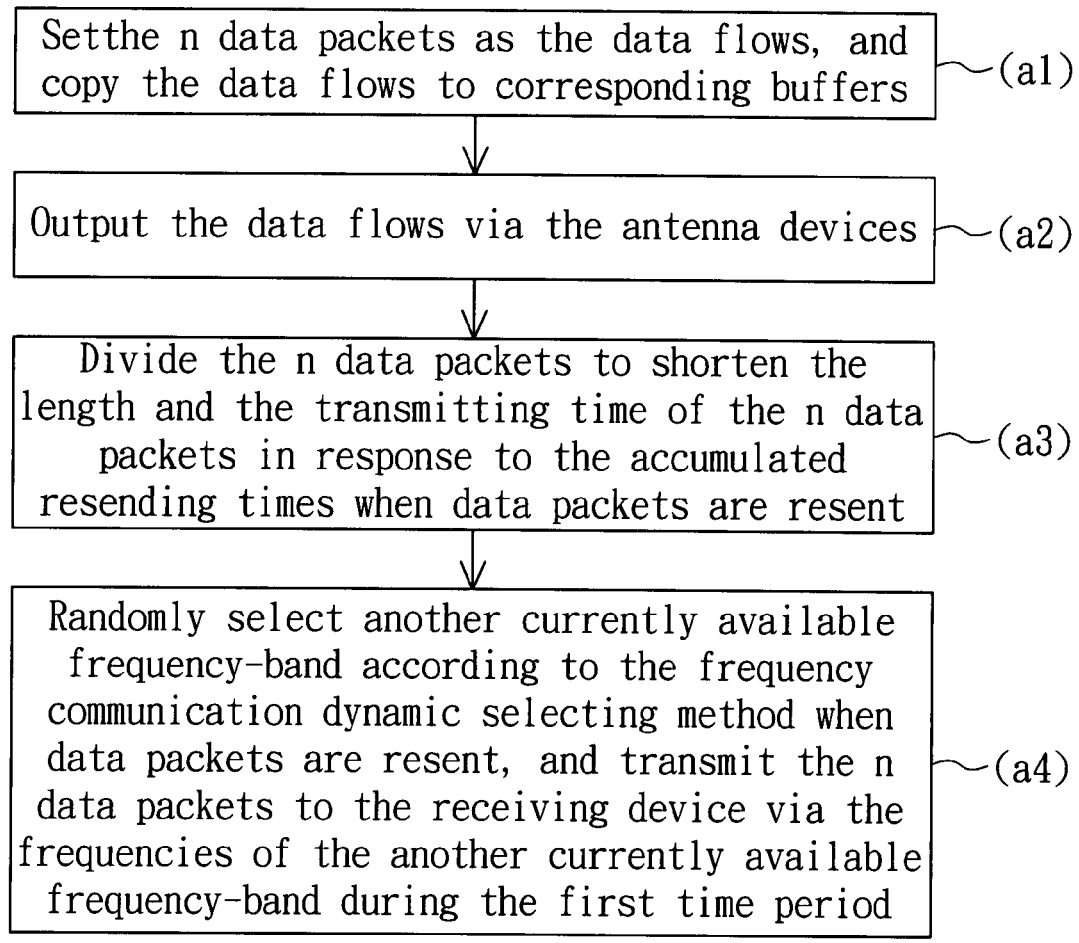
FIG. 5 is a detailed flowchart of the step (a) of FIG. 2A.

Referring to FIG. 5, a detailed flowchart of the step (a) of FIG. 2A is shown. In the preferred embodiment of the invention, step (a) of transmitting n data packets of the data packets DP to the receiving device 140 during a time period further includes the following sub-steps. Firstly, as indicated in step (a1), the transmitting device 12 sets n data packets as a data flow, and copies the data packets of the data flows to the corresponding diverse-space buffer. For example, the n data packets are set as data flows A and B, respectively including data packets A1, A2 and A3 and data packets B1, B2 and B3, which are copied to the diverse-space buffers 125A and 125B as indicated in FIG. 3. Next, as indicated in step (a2), the data flows are outputted to the receiving device 14 by corresponding antenna devices 123A and 123B. If the data packet needs to be resent, then step (a2) is repeated.

Step (a) further includes step (a3) of dividing the n data packets into several ones to shorten the transmitting time of the n data packets according to the times of packet-resending. For example, when the times of packet-resending exceeds another pre-determined parameter, the length of the n data packets is shortened into a half and the half-lengthed data packets are outputted, then step (a2) is repeated as indicated in FIG. 4. Another choice of the pre-determined parameter is the times in the condition where the successful demodulation rate of data packets by the receiving device 14 is, for example, 80%.

Step (a) further includes step (a4) of randomly selecting a currently available frequency-band according to the frequency communication dynamic selecting method when data packets are resent; and then outputting the n data packets to the receiving device 14 via the frequencies of the available frequency-band in the next time period.

According to the data transmitting method for wireless communication system of the preferred embodiment of the invention, if the accumulated number exceeds the predetermined value in the step (c), the quality of the wireless communication is improved by both the frequency communication dynamic selecting method disclosed in steps (d')~(g) and the dynamic delay time adjusting communication method disclosed in steps (h')~(l) sequentially. However, if the accumulated number exceeds the predetermined value in the step (c), the invention can perform either the dynamic delay time adjusting communication method or the frequency communication dynamic selecting method; besides the order of these two methods could be swapped. Thus, in step (a), step (a3) and (a4) can be omitted.

In the data transmitting method, whether the current channel quality of the wireless communication channel is lower than the user's minimum tolerable limit is determined according to the times of packet-resending by the transmitting device during a time period. If the channeling quality of the wireless communication channel is lower than the user's minimum tolerable limit, the frequency communication dynamic selecting method and the dynamic delay time adjusting communication method are used repeatedly to improve the channeling quality. Thus, the data transmitting method for wireless communication system of the preferred embodiment of the invention is capable of effectively resolving the problem that the transmission efficiency deteriorates while under a poor quality of the wireless communication environment. Besides, the data transmitting method further has the advantages of reducing the likelihood of repeated transmission Besides, the data transmitting method also effectively improves the transmission efficiency of wireless communication while under a poor quality of the wireless communication environment as well.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A data transmitting method for wireless communication system applied in a transmitting device for transmitting a plurality of data packets to a receiving device, the data transmitting method comprising:
　　(a) transmitting n data packets to the receiving device during a first time period, wherein n is a natural number;
　　(b) recording a first accumulated number, wherein the first accumulated number is the times of packet-resending during the first time period;
　　(c) determining whether the first accumulated number exceeds a predetermined value; and
　　(d) when the first accumulated number does not exceed the predetermined value, clearing the first accumulated number and transmitting the remaining data packets to the receiving device;
　　wherein after step (c), the method further comprises:
　　　　(d') when the first accumulated number exceeds the predetermined value, randomly selecting a first currently available frequency-band according to a frequency communication dynamic selecting method;
　　　　(e) transmitting the remaining m data packets to the receiving device via a plurality of first frequencies of the first currently available frequency-band during a second time period, wherein m is a natural number;
　　　　(f) recording a second accumulated number, wherein the second accumulated number is the times of packet-resending during the second time period;
　　　　(g) determining whether the second accumulated number exceeds the predetermined value;
　　　　(h) clearing the second accumulated number and transmitting the remaining data packets to the receiving device via the first frequencies if the second accumulated number does not exceed the predetermined value;

(h') estimating a delay time sample according to a dynamic delay time adjusting communication method if the second accumulated number exceeds the predetermined value;

(i) transmitting the remaining k data packets to the receiving device according to the delay time sample during a third time period, wherein k is a natural number;

(j) recording a third accumulated number, wherein the third accumulated number is the times of packet-resending during the third time period;

(k) determining whether the third accumulated number exceeds the predetermined value; and (l) clearing the third accumulated number and transmitting the remaining data packets to the receiving device via the delay time sample if the third accumulated number does not exceed the predetermined value.

2. The data transmitting method for wireless communication system according to claim 1, wherein between step (d') and step (e), the method further comprises:

(d1) dividing the m data packets to shorten the length of the m data packets.

3. The data transmitting method for wireless communication system according to claim 1, wherein after step (k), the method further comprises:

performing step (d') to select a second currently available frequency-band for transmitting the k data packets if the third accumulated number exceeds the predetermined value.

4. The data transmitting method for wireless communication system according to claim 1, wherein the transmitting device further comprises a plurality of antenna devices respectively outputting the data packets via a plurality of data flows and, the transmitting device further comprises a plurality of diverse-space buffers respectively corresponding to the antenna devices;

Wherein, each of the buffers is used for storing the data flow of other antenna device and outputting the data flow via the corresponding antenna device when the other antenna device fails in transmitting the another data flow.

5. The data transmitting method for wireless communication system according to claim 4, wherein step (a) comprises:

(a1) setting the n data packets as the data flows, and copying the data flows to the corresponding diverse-space buffers; and (a2) outputting the data flows via the antenna devices so as to output the n data packets to the receiving device.

6. The data transmitting method for wireless communication system according to claim 1, wherein step (a) further comprises:

(a1) dividing the n data packets to shorten the length of the n data packets in response to the times of packet-resending.

7. The data transmitting method for wireless communication system according to claim 1, wherein step (a) further comprises:

(a1) randomly selecting the first currently available frequency-band according to a frequency communication dynamic selecting method when data packets are resent, and transmitting the n data packets to the receiving device via a plurality of first frequencies of the first currently available frequency-band during the first time period.

8. A data transmitting method for wireless communication system applied in a transmitting device for transmitting a plurality of data packets to a receiving device, the data transmitting method comprising:

(a) transmitting n data packets to the receiving device during a first time period, wherein n is a natural number;

(b) recording a first accumulated number, wherein the first accumulated number is the times of packet-resending during the first time period;

(c) determining whether the first accumulated number exceeds a predetermined value; and (d) when the first accumulated number does not exceed the predetermined value, clearing the first accumulated number and transmitting the remaining data packets to the receiving device;

(d") when the first accumulated number exceeds the predetermined value, estimating a delay time sample according to the dynamic delay time adjusting communication method;

(e') transmitting the remaining m data packets to the receiving device according to the delay time sample during a second time period, wherein m is a natural number;

(f') recording a second accumulated number, wherein the second accumulated number is the times of resending the n data packets during the second time period;

(g') determining whether the second accumulated number exceeds the predetermined value; and (h") when the second accumulated number does not exceed the predetermined value, clearing the second accumulated number and transmitting the remaining data packets to the receiving device via the delay time sample.

9. The data transmitting method for wireless communication system according to claim 8, wherein between step (d") and step (e'), the method further comprises:

(d1') dividing the m data packets to shorten the length of the m data packets.

10. The data transmitting method for wireless communication system according to claim 8, wherein after step (g'), the method further comprises:

(h'") when the second accumulated number exceeds the predetermined value, randomly selecting a first currently available frequency-band according to the frequency communication dynamic selecting method;

(i') transmitting the remaining k data packets to the receiving device via a plurality of first frequencies of the first currently available frequency-band during a third time period, wherein k is a natural number;

(j') recording a third accumulated number, wherein the third accumulated number is the times of resending the n data packets during the third time period;

(k') determining whether the third accumulated number exceeds the predetermined value; and (l') clearing the third accumulated number and transmitting the remaining data packets to the receiving device via the first frequencies if the third accumulated number does not exceed the predetermined value.

* * * * *